United States Patent [19]

Snell et al.

[11] 3,947,346

[45] Mar. 30, 1976

[54] COAL LIQUEFACTION

[75] Inventors: George J. Snell, Fords; Joon Taek Kwon, Freehold Township, both of N.J.

[73] Assignee: The Lummus Company, Bloomfield, N.J.

[22] Filed: Sept. 20, 1974

[21] Appl. No.: 507,787

[52] U.S. Cl. .................................. 208/10; 208/8
[51] Int. Cl.² ........................................ C10G 1/04
[58] Field of Search ............... 208/8, 10, 85, 88, 89

[56] References Cited
UNITED STATES PATENTS

| | | | |
|---|---|---|---|
| 3,162,594 | 12/1964 | Gorin | 208/8 |
| 3,184,401 | 5/1965 | Gorin | 208/8 |
| 3,700,583 | 10/1972 | Salamony et al. | 208/8 |
| 3,700,586 | 10/1972 | Schulman | 208/89 |
| 3,791,956 | 2/1974 | Gorin et al. | 208/10 |
| 3,852,182 | 12/1974 | Sze et al. | 208/8 |
| 3,852,183 | 12/1974 | Snell | 208/8 |

*Primary Examiner*—Delbert E. Gantz
*Assistant Examiner*—James W. Hellwege
*Attorney, Agent, or Firm*—Marn & Jangarathis

[57] ABSTRACT

A coal liquefaction product is separated into an essentially solid free stream and a solid containing stream including the coal ash. The solid containing stream is hydrotreated, in the absence of added catalyst, and valuable clean fuel components stripped from the hydrotreated stream. The combustibles content of the stripped solid containing stream is reduced by hydrotreatment, prior to stripping.

11 Claims, 1 Drawing Figure

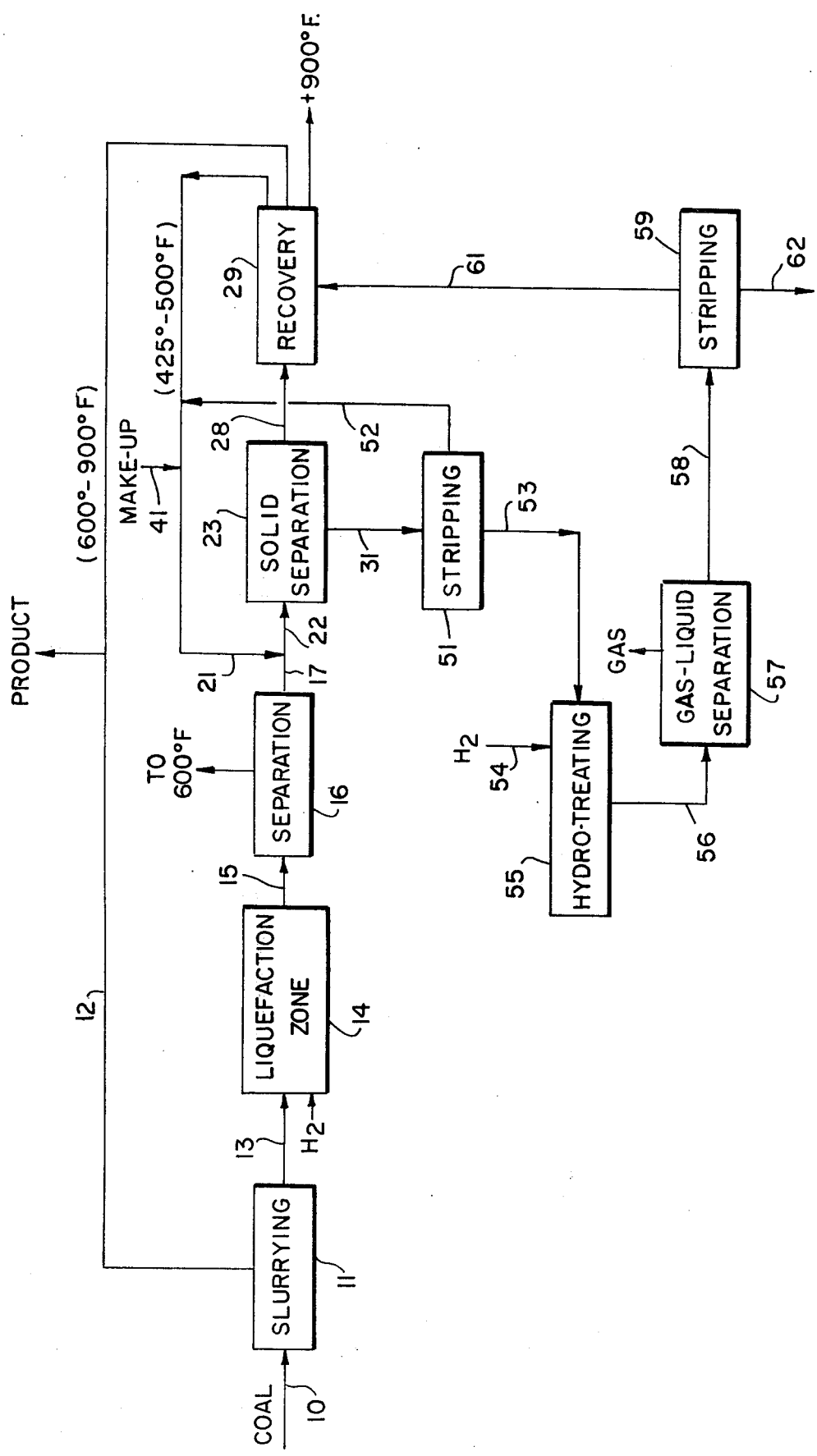

COAL LIQUEFACTION

This invention relates to coal liquefaction, and more particularly, to improved recovery of valuable components from a coal liquefaction product.

Coal can be converted to valuable products by subjecting coal to solvent extraction, with or without hydrogen, to produce a mixture of coal extract and undissolved coal residue, including undissolved extractable carbonaceous matter, fusain and mineral matter or ash.

In separating the solid material from the coal extract, in many cases, the separated stream, containing the solids, includes combustibles which represent a potential product loss. Accordingly, there is a need for reducing the amount of valuable products present in the separated solid containing stream.

An object of the present invention is to provide for improved coal liquefaction.

Another object of the present invention is to provide for improved recovery from coal of combustible products, as clean fuel.

These and other objects of the invention should be more readily apparent from reading the following description thereof.

In accordance with the present invention, a coal liquefaction product is separated into an essentially solids free coal extract, and a solids containing liquid stream, including the coal ash. The solids containing liquid stream is hydrotreated, in the absence of added extraneous catalyst, and valuable components are stripped from the hydrotreated solids containing stream to produce a flowable stripped solids containing stream having a reduced content of combustibles. It has been found that by hydrotreating the solids containing stream, there can be obtained a flowable stripped solids containing stream having a lower amount of combustibles than would be obtained by omitting the hydrotreating step. In this manner, there is improved recovery of combustible products as clean fuel; i.e., combustible products free of solid containing material.

More particularly, in accordance with the overall invention, a coal liquefaction product is introduced into a liquid-solids separation zone in order to recover a coal extract essentially free of solids and a flowable solid containing stream including the coal ash. The liquid-solids separation may be effected in any of a wide variety of ways, but as hereinafter described, the overall process of the present invention is particularly directed to effecting such separation by gravity settling in the presence of a liquid promoter.

A solid containing liquid stream, recovered from the liquid-solid separation zone is introduced into a hydrotreating zone wherein the solid containing liquid stream is contacted with hydrogen in the absence of added extraneous catalyst. The hydrotreating is described as being effected in the absence of added extraneous catalyst, instead of as being "non-catalytic" in that the ash and/or solid coal particles may exert a catalytic effect on the hydrotreating operation.

The hydrotreated solid containing stream is then introduced into a stripping zone to strip valuable clean fuel components therefrom. In general, such stripping is effected to recover those components boiling up to about 900°F; however, it is to be understood that the stripping could be effected to recover components having an upper cut point below 900°F although, in most cases, the failure to recover such components represents potential loss of valuable components. Similarly, the stripping could be effected to recover some components boiling above 900°F, provided the stripped solid containing stream contains sufficient liquid components to maintain a flowable stream.

In general, in order to maintain a flowable stripped solid containing stream, the stripped solid containing stream, contains at least about 35% Benzene solubles. (Benzene solubles is defined as 100 minus Benzene insolubles, with Benzene insolubles as known in the art, being conveniently determined by ASTM O-367-67). As should be apparent, the amount of Benzene solubles present in the stripped solid containing stream is directly proportional to the amount of combustible liquid and, accordingly, the upper limit of Benzene solubles is set by the desired minimization of liquid combustibles in the stripped solid containing stream. In general, the Benzene solubles of the stripped solid containing stream is less than about 70 wt.%, and most generally in the order of 40 to 60 weight percent. It should also be apparent that it would be desirable to reduce the Benzene solubles content to less than 35 weight percent in order to minimize the amount of liquid combustibles in the stripped solid containing stream, but the necessity to maintain flowable streams generally precludes a further reduction in Benzene solubles.

The invention will be further described with respect to the preferred embodiment thereof wherein solids are separated from a coal liquefaction product by gravity settling in conjunction with a promoter liquid to promote and enhance the separation of insoluble material from the coal.

The liquid which is employed to enhance and promote the separation of insoluble material from the coal liquefaction product is generally a hydrocarbon liquid having a characterization factor (K) of at least about 9.75 and preferably at least about 11.0 wherein:

$$K = \sqrt[3]{\frac{T_B}{G}}$$

wherein $T_B$ is the molal average boiling point of the liquid (°R); and G is specific gravity of the liquid (60 F/60°F).

The characterization factor is an index of the aromaticity/parafinicity of hydrocarbons and petroleum fractions as disclosed by Watson & Nelson, Ind. Eng. Chem. 25,880 (1933), with more parafinic materials having higher values for the characterization factor (K). The promoter liquid which is employed is one which has a characterization factor (K) in excess of 9.75 and which is also less aromatic than the liquefaction solvent; i.e., the characterization factor K of the promoter liquid has a value which is generally at least 0.25, higher than the characterization factor of the liquefaction solvent.

The following Table provides representative characterization factors (K) for various materials:

TABLE

| | |
|---|---|
| Anthracene | 8.3 |
| Naphthalene | 8.4 |
| 425–500°F Coal Tar Distillate | 8.8 |
| 550–900°F Coal Tar Distillate | 9.1 |
| 600–900°F Coal Tar Distillate | 9.0 |
| 400–450°F Coal Tar Distillate | 9.4 |
| Benzene | 9.8 |
| Tetrahydronaphthalene | 9.8 |
| o-xylene | 10.3 |
| Decahydronaphthalene | 10.6 |
| Cyclohexane | 11.6 |

TABLE-continued

| | |
|---|---|
| 425–500°F Boiling Range Kerosene | 11.9 |
| n-Dodecylbenzene | 12.0 |
| Propylene Oligomers (pentamer) | 12.2 |
| Cetene | 12.8 |
| Tridecane | 12.8 |
| n-Hexane | 12.9 |
| Hexadecane or cetane | 13.0 |

The liquid which is used to enhance and promote the separation of insoluble material is further characterized by a 5 volume percent distillation temperature of at least about 250°F and a 95 volume percent distillation temperature of at least about 350°F and no greater than about 750°F. The promoter liquid preferably has a 5 volume percent distillation temperature of at least about 310°F and most preferably of at least about 400°F. The 95 volume percent distillation temperature is preferably no greater than about 600°F. The most preferred promoter liquid has a 5 volume percent distillation temperature of no greater than about 500°F. It is to be understood that the promoter liquid may be a hydrocarbon; e.g., tetrahydronaphthalene, in which case the 5 volume percent and 95 volume percent distillation temperatures are the same; i.e., the hydrocarbon has a single boiling point. In such a case, the boiling point of the hydrocarbon must be at least about 350°F in order to meet the requirements of a 5 volume percent distillation temperature of at least about 250°F and a 95 volume percent distillation temperature of at least about 350°F. The promoter liquid is preferably a blend mixture of hydrocarbons in which case the 5 volume percent and 95 volume percent distillation temperatures are not the same.

The 5 volume and 95 volume percent distillation temperature may be conveniently determined by ASTM No. D 86-67 or No. D 1160 with the former being preferred for those liquids having a 95 percent volume distillation temperature below 600°F and the latter for those above 600°F. The methods for determining such temperatures are well known in the art and further details in this respect are not required for a full understanding of the invention. It is also to be understood that the reported temperatures are corrected to atmospheric pressure.

As representative examples of such liquids, there may be mentioned: kerosene or kerosene fractions from paraffinic or mixed base crude oils; middle distillates, light gas oils and gas oil fractions from paraffinic or mixed base crude oils; alkyl benzenes with side chains containing 10 or more carbon atoms; paraffinic hydrocarbons containing more than 12 carbon atoms; white oils or white oil fractions derived from crude oils; alphaolefins containing more than 12 carbon atoms; fully hydrogenated naphthalenes and substituted naphthalenes; propylene oligomers (pentamer and higher); tetrahydronaphthalene, heavy naphtha fractions, etc. The most preferred liquids are kerosene fractions; white oils; fully hydrogenated naphthalenes and substituted naphthalenes; and tetrahydronaphthalene.

The amount of liquid promoter used for enhancing and promoting the separation of insoluble matter from the coal liquefaction product will vary with the particular liquid employed, the coal liquefaction solvent, the coal used as starting material and the manner in which the liquefaction is effected. As should be apparent to those skilled in the art, the amount of liquid promoter used should be minimized in order to reduce the overall costs of the process. It has been found that by using the liquid of controlled aromaticity, in accordance with the teachings of the present invention, the desired separation of insoluble material may be effected with modest amounts of liquid promoter. In general, the weight ratio of liquid promoter to coal solution may range from about 0.2:1 to about 3.0:1, preferably from about 0.3:1 to about 2.0:1 and, most preferably from about 0.3:1 to about 1.5:1. In using the preferred promoter liquid which is kerosene fraction having 5 percent and 95 percent volume distillation temperatures of 425°F, and 500°F, respectively, promoter liquid to coal solution weight ratios in the order of 0.4:1 to 0.6:1 have been particularly successful. It is to be understood, however, that greater amounts of liquid promoter may be employed but the use of such greater amounts is uneconomical. In addition, the use of an excess of liquid promoter may result in the precipitation or separation of an excessive amount of desired coal derived products from the coal extract. More particularly, as the amount of liquid promoter employed is increased, a greater amount of ash is separated from the coal solution, but such increased ash separation is accompanied by an increased separation of desired coal derived products from the coal solution. By using the liquid promoters as herein described, not only may modest amounts of solvent be employed, but, in addition, ash may be effectively separated from the coal solution; e.g., in amounts greater than 90 percent, without an excessive loss of desired coal derived products.

The gravity settling is generally effected at a temperature from about 300°F to about 600°F, preferably from about 350°F to 500°F and at a pressure from about 0 psig to about 500 psig, preferably from about 0 psig to about 300 psig. In general, the residence time for the settling is in the order of 0.1 to 8 hours and preferably from 0.2 to 4 hours. The gravity settling may be effected in one, two or more gravity settlers. The gravity settling may be effected as described in copending application Ser. No. 452,409 filed on Mar. 18, 1974 which is hereby incorporated by reference in order to provide a net underflow having an ash content of at least 6 weight percent and preferably 8 to 16 weight percent.

The net underflow from the gravity settling, prior to hydrotreating, is preferably introduced into a stripping zone to separate any promoter liquid present in the liquid underflow. In this manner, the recovery of promoter liquid from the net underflow is facilitated; however, it is to be understood that the promoter liquid stripping step could be omitted, and net underflow fed directly to the hydrotreating step.

The net underflow is then introduced with hydrogen into a non-catalytic hydrotreating zone, preferably a tubular type reactor free of added catalyst. The hydrotreating is generally effected at temperatures from about 600°F to about 900°F, preferably from about 730°F to about 830°F, and pressures from about 500 to about 3000 psig, preferably from about 1000 to about 2000 psig. The liquid hourly spaced velocity is generally in the order of from 0.5 to 6.0 $hr^{-1}$, and preferably from 1.0 to 3.0 $hr^{-1}$. It is to be understood that the scope of the invention is not limited to such processing conditions in that the determination of such processing conditions is within the scope of those skilled in the art from the teachings herein.

The liquid portion of the hydrotreated solid containing effluent is then introduced into a stripping zone to strip valuable products therefrom wherein preferably components boiling up to 900°F are stripped from the hydrotreated underflow, while recovering a flowable stripped solid containing stream. In general, the stripping zone is operated at a temperature from about 500°F to about 900°F, and a pressure from about 10mm Hg to 760mm Hg. It is to be understood, however, that such conditions are merely illustrative, and the selection of other suitable conditions is deemed to be within the scope of those skilled in the art from the teachings herein.

In a coal liquefaction process, potential clean fuel values loss is measured approximately by the amount of combustibles which are present in stripped underflow, with the combustible matter being comprised of coal derived heavy oil and unreacted coal and/or associated petrographic constituents. In accordance with the present invention, the amount of combustibles present in the stripped solid containing stream (conveniently measured as a combustible to ash ratio) will vary depending upon the solid combustible content (unreacted coal and/or associated petrographic constituents) of the coal used as the original feed. Thus, for example, for a coal with a low ash content and high content of unreactive carbon, the combustible to ash ratio in the stripped underflow may be in the order of 4.0 or 5.0, whereas for a coal with high ash and low unreactive carbon, the combustible to ash weight ratio may be in the order of 2.5 or less. However, by proceeding in accordance with the present invention, for a given coal source, the combustible to ash ratio of the stripped underflow can be minimized while maintaining flowable conditions.

In addition, the net coal product (the extracted carbonaceous matter, excluding promoter liquid, liquefaction solvent and gas make), hereinafter sometimes referred to as "coal product", contains less than about 0.5 percent insoluble material, all by weight. The specific amount of insoluble material which is permitted to be present in the coal product is dependent upon the product standards, and the deashing is controlled in order to provide the required specifications. Based on an Illinois type coal, the production of a coal product having less than 0.05 percent, by weight, insoluble material, corresponds to 99+ percent ash removal, but as should be apparent to those skilled in the art, the percent ash removal required to provide a coal product having the required minimum amount of insoluble material is dependent upon the initial ash content of the coal. Thus, in accordance with the present invention, the liquid promoter is added to the coal solution in an amount, as hereinabove described, to provide a coal product in which insoluble material is present in an amount of less than about 0.05 percent, by weight, and to provide a flowable stripped underflow having a reduced amount of combustibles.

The liquid promoter may also be prepared by blending a material having a characterization factor below 9.75 with a material having a characterization factor above 9.75 and the boiling properties as hereinabove described. The use of blended materials is a convenient manner of regulating the characterization factor.

The invention will be further described with respect to an embodiment thereof illustrated in the accompanying drawing. It is to be understood, however, that the scope of the invention is not to be limited thereby.

The drawing is a simplified schematic flow diagram of an embodiment of the invention.

Referring to the drawing, ground or pulverized coal, generally bituminous, sub-bituminous or lignite, preferably bituminous coal, in line 10 is introduced into a coal solvation and slurrying zone 11 along with a coal liquefaction solvent in line 12. The coal liquefaction solvent may be any one of the wide variety of coal liquefaction solvents used in the art, including both hydrogen donor solvents, non-hydrogen donor solvents and mixtures thereof. These solvents are well known in the art and, accordingly, no detailed description thereof is deemed necessary for a full understanding of the invention. As particularly described, the coal liquefaction solvent is a 600°–900°F solvent which is recovered from the coal liquefaction product and which has not been subjected to hydrogenation subsequent to the recovery thereof. The solvent is added to the coal in an amount sufficient to effect the desired liquefaction, and in general, is added in an amount to provide a solvent to coal weight ratio from about 1:1 to about 20:1, and preferably from about 1.5:1 to about 5:1.

A coal paste is withdrawn from zone 11 through line 13 and introduced into a coal liquefaction zone 14 wherein, as known in the art, the coal is converted to liquid products. The liquefaction zone 14 is operated as known in the art and may be catalytic or non-catalytic and may be effected in the presence or absence of added hydrogen. The hydrogenation may be effected in a fixed catalyst bed, fluidized catalyst bed or in an expanded or ebullating bed. The details of the coal liquefaction step form no part of the present invention, and accordingly, no details thereof are required for a full understanding of the invention. As particularly described, the coal liquefaction is effected in the presence of added hydrogen. The hydrogenation as known in the art, increases the recovery of coal products and also reduces the sulfur and nitrogen content of the recovered liquid coal product. Typical process conditions are temperatures from 650° to 900°F and pressures from 500 to 4000 psig. The liquefaction is preferably effected in an upflow ebullating bed, as known in the art; e.g., as described in U.S. Pat. No. 2,987,465 to Johanson. The coal liquefaction zone, as known in the art, includes means for recovering the various gaseous products.

A coal liquefaction product, comprised of a liquid coal extract of dissolved carbonaceous matter in the coal liquefaction solvent and insoluble material (ash and undissolved coal) is withdrawn from the liquefaction zone 14 through line 15 and introduced into a separation zone 16 to separate from the coal liquefaction product at least those materials boiling up to about 95 volume percent distillation temperature of the liquid to be used for promoting and enhancing the separation of the insoluble material. The separation zone 16 may include an atmospheric or vacuum flashing chamber or tower, and as particularly described separation zone 16 is designed and operated to separate components boiling up to about 600°F.

A coal liquefaction product, free of components boiling up to about 600°F withdrawn from separation zone 16 through line 17, is mixed with promoter liquid in line 21 of controlled aromaticity; i.e., the characterization factor of the promoter liquid has a value which is generally at least 0.25 units greater than the characterization factor of the coal liquefaction solvent. As particularly described, the promoter liquid is a kerosene fraction which has a 5 volume percent and 95 volume percent distillation temperatures which fall within the range from about 425°–500°F and is derived from a naphthenic or paraffinic distillate.

The combined stream of coal liquefaction product and promoter liquid in line 22 is introduced into a gravity settling zone, generally designated as 23.

Essentially solid free overflow is recovered from gravity settling zone 23, and in line 28 and introduced into a recovery zone 29 for recovering promoter liquid and various fractions of the coal extract.

The recovery zone 29 may be comprised of one or more fractionators to distill various fractions from the product. As particularly described, the recovery zone is operated to recover a first fraction having 5 percent and 95 percent volume distillation temperature of from 425° to 500°F, which is to be used as the promoter liquid for enhancing and promoting separation of solid material from the coal liquefaction product; a second fraction (600°–900°F) a portion of which may be used as the coal liquefaction solvent in line 12 and a further portion thereof recovered as product, and a residual product (+900°F) of low ash and reduced sulfur content. The promoter liquid recovered in the recovery zone is admixed with the liquefaction product in line 17 and makeup may be provided through line 41.

The net underflow containing dispersed insoluble material, including the ash, is introduced into a stripping zone 51 designed and operated to recover, as overhead, any promoter liquid present in the net underflow. The promoter liquid recovered in zone 51, through line 52 is admixed with the liquefaction product in line 17. As hereinabove described stripping zone 51 can be omitted.

The net underflow, essentially free of promoter liquid, recovered from zone 51 through line 53 is introduced along with hydrogen, in line 54, into a hydrotreating zone 55 to effect hydrogenation of the solids containing underflow. As hereinabove described, the hydrotreating zone 54 is free of extraneous added catalyst.

The hydrotreated solid containing underflow withdrawn from hydrotreating zone 55, through line 56, is introduced into a gas-liquid separation zone, schematically illustrated as 57, to separate gaseous components therefrom.

The solid containing liquid recovered from separation zone 57, in line 58, is introduced into stripping zone 59 wherein material boiling, below about 900°F is stripped therefrom and introduced into the recovery zone 29 through line 61. As hereinabove described, the stripper bottoms in line 62 is flowable solid containing stream having a reduced content of combustibles. The bottoms in line 62 may then be subjected to calcination or coking. Alternatively, part of the stripper bottoms may be used as feedstock to a partial oxidation process for producing hydrogen. As a further alternative, a portion of the stripper bottoms may be used for plant fuel. These uses and others should be apparent to those skilled in the art from the teachings herein. In accordance with the present invention, the coal product (the product recovered from zones 16 and 29, excluding liquefaction solvent and promoter liquid) contains less than 0.05 percent, by weight of insoluble material.

Although the invention has been particularly described with respect to the preferred embodiment wherein solid material is separated by gravity settling in the presence of a promoter liquid, the overall teachings of the invention are also applicable to other separation techniques such as centrifugation and separation by use of a hydrocyclone.

The invention will be further described with respect to the following example, but the scope of the invention is not to be limited thereby.

EXAMPLE 1

A coal paste consisting of 40 weight percent Pennsylvania coal and 60 weight percent nominal 600°–900°F boiling range coal tar distillate paste oil was admixed with hydrogen and admixture continuously fed through a preheater into the bottom of a 1 inch diameter upflow expanded bed reaction cascade (2 reactor in series) operating at the conditions summarized below in Table 1. The temperature of the hydrogen/coal paste admixture was increased to about 675°F in the preheater.

Table 1

| Operating Parameter Summary for Example 1 | |
|---|---|
| Catalyst | Cobalt Molybdate on Alumina Spheres (8–12 mesh) |
| Mode of Contact | Upflow Expanded Bed |
| Coal Paste Feed Rate, gals/hr at 150°F | 3.0 |
| Total Gas Feed Rate, SCF/hr | 320 |
| Liquid Hourly Space Velocity at 150°F, hr$^{-1}$ | 1.6 |
| Operating Pressure (total), psig | 1400 |
| Hydrogen Partial Pressure at Reactor Outlet, psia | 1150 |
| Operating Temperature, °F | 790 ± 30 |

Ash containing reactor effluent was cooled to about 300°F and collected in one of two 30-gallon interchangeable high pressure gas liquid separators piped in parallel. When separator number 1 was about 75–85% full with liquid product, separator 2 was placed on line and the contents of separator 1 were transferred to a low pressure liquid product receiver. The liquid contents of the low pressure receiver were then transferred to a blend tank outfitted with a steam coil.

EXAMPLE 2

After blending, the ash containing coal derived liquid product solution prepared in Example 1 was pumped through an electrically heated coil and into a continuous equilibrium flash unit. The flash chamber was operated at 600±10°F and atmospheric pressure. A feed rate of about 5 gals. per hour and a supplemental nitrogen sparge rate of 50 SCF/hr were used in this operation. Overhead vapors from the flash chamber were condensed and collected in 55 gallon drums, and residual product was collected in a receiver from which it was pumped periodically to a 500 gallon blend tank outfitted with a steam coil. After blending, the composite residual product contained 2.9 weight percent ash, and had an atmospheric pressure initial boiling point of about 575°F.

EXAMPLE 3

Three (3) gals. per hour at 200°F (28.8 lbs/hr) of the composite ash containing residual product prepared in Example 2 were continuously pumped from a 500 gallon blend tank to an inline mixing zone operating at 530±10°F. A nominal 425°–500°F kerosene distillate with a characterization factor of 11.8±0.1 was simultaneously fed at a rate of 1.7 gal/hr at r.t. to the above inline mixer. The thoroughly mixed admixture from the mixing zone was continuously routed to a 16 gallon heated gravity settler operating at 530±10°F and a pressure of 130 psig.

A substantially ash free overflow product and ash enriched underflow product stream was continuously withdrawn from the heated gravity settler. Each settler effluent stream was cooled to about 300°F and collected in separate scale tanks. On the average about 23 lbs of underflow product was withdrawn per 100 lbs of total settler feed. The above deashing run was terminated after about 400 lbs of ash enriched composite underflow was collected in the underflow scale tank. Representative composite 2-gallon samples of the overflow and underflow product solutions were withdrawn from the respective scale tanks and analyzed for ash content. The ash content of the composite overflow and underflow products collected during the deashing run were found to be 0.02 and 8.7 weight percent respectively. Table 2 contains a vacuum distillation analysis of the composite underflow sample prepared in this example. For descriptive purposes this underflow sample is referred to as untreated underflow in Table 2.

EXAMPLE 4

About 6 liters of composite underflow prepared in Example 3 were charged to a steam traced, agitated 8 liter feed tank. This Table 2

| Sample Description | Vacuum Distillation Data Untreated Underflow | Hydrotreated Underflow |
|---|---|---|
| Ash Content of Sample, wt. % | 7.02 | |
| Distillation Data (all temperatures corrected to 760mmHg abs. pressure) | | |
| Initial Boiling Point, °F | 334 | 244 |
| 1 wt% Distilled, °F | 434 | 283 |
| 2.5 wt% Distilled, °F | 453 | 364 |
| 5.0 wt% Distilled, °F | 466 | 434 |
| 7.5 wt% Distilled, °F | 476 | 455 |
| 10.0 wt% Distilled, °F | 485 | 469 |
| 15.0 wt% Distilled, °F | 503 | 486 |
| 20.0 wt% Distilled, °F | 522 | 505 |
| 25.0 wt% Distilled, °F | 540 | 524 |
| 30.0 wt% Distilled, °F | 562 | 543 |
| 35.0 wt% Distilled, °F | 624 | 580 |
| 40.0 wt% Distilled, °F | 677 | 641 |
| 45.0 wt% Distilled, °F | 701 | 677 |
| 50.0 wt% Distilled, °F | 726 | 702 |
| 55.0 wt% Distilled, °F | 751 | 727 |
| 60.0 wt% Distilled, °F | 776 | 751 |
| 65.0 wt% Distilled, °F | 801[4] | 777 |
| 70.0 wt% Distilled, °F | — | 803[4] |
| Distillation Residue Characterization | IV See Table 5 | V |

[4]Point of incipient cracking and/or coking.

feedstock was continuously pumped at a rate of about 800 ml/hr at 200°F to the inlet of an electrically heated heater where it was mixed with hydrogen (12 SCFH). This gas/liquid mixture was heated to about 670°F and fed to a ½ inch I. D. electrically heated empty tubular reactor. Table 3 below summarizes the tubular reactor operating conditions employed in this experiment.

Table 3

| Tubular Reactor Operating Parameter Summary | |
|---|---|
| Liquid Hourly Space Velocity at 200°F, hr$^{-1}$ | 2.0 |
| Average Reactor Operating Temperature, °F | 780 |
| Total Operating Pressure, psig | 1400 |

Tubular reactor effluent liquid product is routed to a combination high pressure gas/liquid separator-receiver tandem operating at about 150°F. At the conclusion of the experiment a composite liquid product was packaged in a multiplicity of 1 qt. wide mouth cans outfitted with friction type lids.

Tables 2 and 5 contain the distillation analysis and distillation residue characterization analytical data respectively for the hydrotreated product. Companion data on the untreated feedstock are also enclosed for reference purposes.

Table 5

| Laboratory Prepared Stripped Underflow Characterization | | |
|---|---|---|
| Laboratory Prepared Stripped Underflow Sample Designation | IV | V |
| | Untreated | Hydrotreated |
| Benzene Solubles, wt% | 41.73 | 45.81 |
| Ash Content | 19.55 | 22.89 |
| Ash Free Benzene Insolubles, wt% Insolubles Content | 38.72 | 31.30 |
| Combustibles/Ash wt ratio | 4.12 | 3.37 |
| Approximate Softening Point, °F. | 425 | 350 |
| Viscosity at 550°F, Poise | | |
| Shear Rate, sec$^{-1}$ | | |
| 0.1 | 1530 | 820 |
| 0.5 | 600 | 275 |
| 1.0 | 410 | 172 |
| 5.0 | 161 | 59.0 |
| 10.0 | 108 | 37.0 |
| 50.0 | 44.0 | 13.0 |
| 100.0 | 29.0 | 8.5 |

The above example indicates that the hydrotreated stripped underflow has a lower amount of combustibles whereby there is a greater recovery of clean fuel components. Furthermore, the hydrotreated stripped underflow is flowable, and less viscous than the untreated underflow.

The present invention is particularly advantageous in that clean fuel recovery from coal is improved by reducing the amount of combustibles in the stripped solid containing stream recovered in the process. In accordance with the preferred aspect of the present invention by subjecting a coal liquefaction product, containing solid material, to gravity settling in the presence of a promoter liquid, hydrotreating of the solid containing underflow from the gravity settling and stripping of the hydrotreated underflow, it is possible to maximize recovery of vaulable clean fuel components by minimizing the combustible content of the residual solid containing stream from the process, while maintaining flowable solids containing streams.

Numerous modifications and variations of the present invention are possible in light of the above teachings and, therefore, within the scope of the appended claims the invention must be practiced otherwise than as particularly described.

What is claimed is:

1. A process for separating insoluble material from a coal liquefaction product, produced from a coal feed, comprised of carbonaceous matter dissolved in a coal liquefaction solvent and insoluble material, comprising:
    separating from the coal liquefaction product an essentially solid free stream and a solid containing liquid stream, including coal ash;
    hydrotreating the solid containing liquid stream at hydrogenation conditions in the absence of extraneous catalyst; and
    stripping the hydrotreated solid containing liquid stream to strip clean fuel components therefrom and produce a stripped flowable solid containing liquid stream having a reduced quantity of combustible products.

2. The process of claim 1 wherein the stripping is effected to provide a stripped flowable solid containing liquid stream, having at least 35% Benzene solubles and less than 70%, Benzene solubles.

3. The process of claim 2 wherein the stripping is effected to strip components boiling at no greater than 900°F 4. The process of claim 3 wherein the hydrotreating is effected at a temperature from 600°F to 900°F and at pressures from 500 to 3000 psig.

5. The process of claim 4 wherein the coal liquefaction product is subjected to gravity settling to separate said essentially solid free and said solid containing stream.

6. The process of claim 5 wherein said gravity settling is effected in the presence of a promoter liquid, said promoter liquid having a characterization factor of at least 9.75, a 5 volume percent distillation temperature of at least about 250°F and a 95 volume percent distillation temperature of at least about 350°F and no greater than about 750°F.

7. A process for producing clean fuel from coal, comprising:
    hydrotreating coal dissolved and dispersed in a liquefaction solvent to produce a coal liquefaction product comprised of carbonaceous matter dissolved in the coal liquefaction solvent and insoluble material;
    separating from the coal liquefaction product, by gravity settling, an essentially solids free stream, as overflow and, as underflow, a solid containing liquid stream, said gravity settling being effected in the presence of a promoter liquid having a characterization factor of at least about 9.75, a 5 volume percent distillation temperature of at least about 250°F, and a 95 volume percent distillation temperature of at least about 350°F and no greater than about 750°F,
    hydrotreating said solid containing liquid stream at hydrogenation conditions in the absence of extraneous catalyst;
    stripping the hydrotreated solid containing liquid stream to strip clean fuel components from the hydrotreated stream and provide a flowable stripped solid containing liquid stream; and
    recovering clean fuel product from the overflow from the gravity settling zone and the clean fuel components recovered in the stripping.

8. The process of claim 7 wherein the stripping is effected to provide a stripped flowable solid containing liquid stream, having at least 35% Benzene solubles and less than 70%, Benzene solubles.

9. The process of claim 8 wherein the stripping is effected to strip components boiling at no greater than 900°F.

10. The process of claim 9 wherein the hydrotreating is effected at a temperature from 600°F to 900°F and at pressures from 500 to 3000 psig.

11. The process of claim 10 wherein the liquid promoter is at least one member selected from the group consisting of kerosene, kerosene fractions, middle distillates, light gas oils, gas oil fractions, heavy naphthas, white oils and white oil fractions, all from crude oils.

* * * * *

UNITED STATES PATENT OFFICE
CERTIFICATE OF CORRECTION

Patent No. 3,947,346                Dated March 30, 1976

Inventor(s) GEORGE J. SNELL AND JOON TAEK KWON

It is certified that error appears in the above-identified patent and that said Letters Patent are hereby corrected as shown below:

In the specification column 2, line 37, the formula (K) should read as follows:

$$K = \sqrt[3]{\frac{T_B}{G}}$$

Signed and Sealed this

Twentieth Day of January 1981

[SEAL]

Attest:

RENE D. TEGTMEYER

Attesting Officer     Acting Commissioner of Patents and Trademarks